(12) United States Patent
Davis et al.

(10) Patent No.: US 9,115,284 B2
(45) Date of Patent: Aug. 25, 2015

(54) BINDER MODIFIED WITH GLYCEROL FOR MAKING ASPHALT MIXES WITH A HICONTENT OF RECYCLED BITUMINOUS MATERIALS

(71) Applicant: COLAS, Boulogne Billancourt (FR)

(72) Inventors: Michael John Davis, Tecumseh, MI (US); Jean-Paul Fort, Cincinnati, OH (US); Thierry Delcroix, Eaubonne (FR)

(73) Assignee: COLAS, Boulogne-Billancourt (FR)

( * ) Notice: Subject to any disclaimer, the term of this patent is extended or adjusted under 35 U.S.C. 154(b) by 301 days.

(21) Appl. No.: 13/870,185

(22) Filed: Apr. 25, 2013

(65) Prior Publication Data
US 2014/0130712 A1    May 15, 2014

(30) Foreign Application Priority Data

Nov. 14, 2012 (FR) ..................................... 12 60844

(51) Int. Cl.
| | |
|---|---|
| *C08L 95/00* | (2006.01) |
| *C09D 195/00* | (2006.01) |
| *C09J 195/00* | (2006.01) |
| *C04B 26/26* | (2006.01) |
| *C08K 5/053* | (2006.01) |
| *C04B 111/00* | (2006.01) |

(52) U.S. Cl.
CPC ................ *C08L 95/00* (2013.01); *C04B 26/26* (2013.01); *C08K 5/053* (2013.01); *C09D 195/00* (2013.01); *C09J 195/00* (2013.01); *C04B 2111/0075* (2013.01); *C08L 2555/10* (2013.01); *C08L 2555/22* (2013.01); *C08L 2555/32* (2013.01); *C08L 2555/34* (2013.01); *C08L 2555/52* (2013.01); *C08L 2555/60* (2013.01); *C09J 2400/00* (2013.01)

(58) Field of Classification Search
CPC .. C09D 195/00; C08J 195/00; C08J 2400/20; C08L 95/00; C08L 2555/34; C08K 5/053
See application file for complete search history.

(56) References Cited

U.S. PATENT DOCUMENTS

| | | | | |
|---|---|---|---|---|
| 5,766,333 | A * | 6/1998 | Lukens | 106/280 |
| 7,811,372 | B2 * | 10/2010 | Nigen-Chaidron et al. | 106/278 |
| 8,702,857 | B2 * | 4/2014 | Venema et al. | 106/281.1 |
| 2009/0264561 | A1 * | 10/2009 | Carlson | 524/68 |
| 2012/0252938 | A1 | 10/2012 | Des Jarlais et al. | |
| 2013/0136855 | A1 * | 5/2013 | Subotic et al. | 427/138 |
| 2014/0338565 | A1 * | 11/2014 | Severance et al. | 106/234 |

FOREIGN PATENT DOCUMENTS

FR    2749595    12/1997

OTHER PUBLICATIONS

FR Search Report dated Aug. 9, 2013; Application No. FR 1260844.
Baron Colbert et al.: "The properties of asphalt binder blended with variable quantities of recycled asphalt using short term and long term aging simulations", Construction and Building Materials, Elsevier, Netherlands, vol. 26, No. 1, Jun. 18, 2011, pp. 552-557, XP028285566.

\* cited by examiner

*Primary Examiner* — David M Brunsman
(74) *Attorney, Agent, or Firm* — Young & Thompson

(57) ABSTRACT

The present invention generally relates to asphalt mixes with a high content of recycled bituminous materials including a binder modified with glycerol. The present invention further relates to a method for preparing the asphalt mixes and to the use of the asphalt mixes as materials for making courses and/or surfacing for road construction and/or civil engineering. The present invention also relates to the use of glycerol as a correcting agent for the workability and/or of the thermal cracking resistance and/or of the rutting resistance of an asphalt mix with a high content of recycled bituminous materials.

18 Claims, 2 Drawing Sheets

FIG. 1

BINDER MODIFIED WITH GLYCEROL FOR MAKING ASPHALT MIXES WITH A HIGH CONTENT OF RECYCLED BITUMINOUS MATERIALS

FIELD OF THE INVENTION

The present invention generally relates to asphalt mixes with a high content of recycled bituminous materials comprising a binder modified with glycerol. The present invention further relates to a method for preparing said asphalt mixes and to the use of said asphalt mixes as materials for making courses and/or coatings for road construction and/or civil engineering. The present invention also relates to the use of glycerol as a correcting agent for workability and for promoting low temperature-cracking resistance and rutting resistance of an asphalt mix with a high content of recycled bituminous materials.

BACKGROUND OF THE INVENTION

In the road construction field, and especially for making pavements, the asphalt mixes are extensively known and defined as being aggregates coated with a hydrocarbon binder. The aggregates are traditionally a mixture of mineral fillers such as chips, sands and fines. The hydrocarbon binder is typically based on bitumen because since it advantageously changes its consistency depending on temperature, bitumen is particularly well suited to road construction: (1) at high temperatures, the bitumen decrease in viscosity enables to coat the mixture of mineral fillers during the production of asphalt mixes, then to compact said asphalt mixes during the implementation thereof; (2) while, at operating temperatures, the bitumen adhesive strength and cohesion enables to ensure stability to the mineral construction under traffic strain.

Bitumen rheological properties thus play a crucial role in the production of asphalt mixes, and in road construction and pavement performance, even if the bitumen content does generally not exceed 7% by weight of the asphalt mix total weight.

However, bitumen rheological properties are evolving, and performance in service of pavements mainly depends on such evolution.

On the one hand, pavements are submitted to the mechanical stresses of road traffic (which vary with the loading rate), and to thermal and oxidizing actions associated with the ambient conditions (air, water, UV, de-icing salts . . . ). Bitumen reacts to such mechanical and environmental stress factors by having three different types of behaviour with a specific pavement degradation:

(1) At high temperatures and/or at lower level of stress, bitumen has a viscous behaviour, which induces a plastic deformation of the bituminous mortar (the part made of sands and fines coated with bituminous binder contained in an asphalt mix) resulting in the pavement rutting if the fillers are not taken up by the mineral skeleton.

(2) At low temperatures and/or at higher level of stress, bitumen behaves as an elastic solid, which may lead, if vehicles do carry heavy loads, to a brittle fracture of the binder and to the formation of a crack appearing in the mortar; this is what is called the pavement thermal cracking.

(3) In the intermediate temperature range, the behaviour of bitumen is intermediate and said to be viscoelastic. When small deformations induced by the road traffic accumulate, then a gradual degradation of the bituminous mortar can be observed and finally cracks develop; this is what is called the pavement fatigue cracking.

On the other hand, bitumen properties change

As soon as production and implementation operations begin, bitumen as a thin film is carried to high temperatures in the presence of air and does undergo, in addition to a loss of the most volatile fractions, a substantial oxidation.

Such ageing phenomenon thereafter slowly continues within the existing asphalt during the whole life-cycle of the pavement; this is accompanied by a chemical change together with a hardening of the binder, which promotes the brittle fracture at low temperature (thermal cracking) and the development of fatigue cracking in the intermediate temperature range.

As a consequence, the properties of bitumens and their evolution play an important role in the production, the construction and performance of pavements made with bituminous asphalt mixes. Bitumen is usually selected depending on the climate, on the level of traffic stress and on the final structural function of the asphalt (binder course, wearing course, sub-grade course . . . ). Because of the crucial influence of bitumen rheological properties in the production of asphalt mixes, and in the construction and performance of pavements, specifications have been established so as to classify bitumens according to their rheological properties, and to control bitumen rheological properties and their incidence onto the performance of pavements.

In Europe, the traditional most widely used specifications are based upon:

empiric tests relative to the consistency at room temperature (Penetration test at 25° C. according to the ASTM D5 or EN 1426 standard), and/or at higher temperatures (Softening test with ring and ball above 40° C., according to the ASTM D36 or EN 1427 standard), and/or viscosity measurements so as to evaluate the pumping ability, the mixing ability and the compaction capacity (cinematic viscosity at 135° C. according to the ASTM D2170 or EN 12595 standard; rotating viscometer at 135° C. according to the AASHTO T-316 or EN 13302 standard) or so as to evaluate the risk of creep (dynamic viscosity at 60° C. according to the ASTM D D4190 or EN 12596 standard).

Bitumens are thus classified depending on the results obtained in these tests. For example, a 20-30 grade bitumen means that such bitumen has a penetrability at 25° C. as measured according to the EN1426 standard, which varies from 20¹/₁₀th to 30¹/₁₀th of a mm.

However, the hereabove described traditional specifications do neither deal with the viscoelastic behaviour of bitumens, nor with their rheological properties at low temperature, nor with the impact of their ageing. That is why a program called Strategic Highway Research Program (SHRP) was developed in the United States, which gave rise to the so called "superpave" specifications (Superior Performing Asphalt Pavement). The Superpave specifications, which are described in the AASHTO M320-10 American standard, classify bitumens depending on their mechanical performances at high and low temperatures by integrating procedures, which simulate the ageing of the bitumen in the short and the long run.

The Superpave specifications thus define the performance grade of bitumen (PG) relative to a particular pair of temperatures, a maximum and a minimum one: the pavement highest temperature for the 7 hottest consecutive days, and the pavement lowest temperature for the coldest day. For example, a PG 58-28 means that the pavement highest temperature for the 7 hottest consecutive days is 58° C. and the pavement lowest temperature for the coldest day is −28° C. Moreover, the higher limit of temperature (for example 58° C.) does correspond to the temperature, at which the minimum resistance to creep has been reached, the creep being the physical phenomenon upon which the irreversible deformation of a material occurs, after having been submitted for a sufficient time to a constant stress that is lower than the elastic limit of the material. The lower limit of temperature (for example −28° C.) does correspond to the temperature at which the bitumen resistance to thermal shrinkage-induced stresses has been reached.

In the Superpave specifications, the bitumen mechanical performance criteria remain constant, only the temperatures do change, at which such criteria must be met. This enables therefore to select a bitumen depending on its mechanical performances for a climatic area and given road traffic conditions. Thus, bitumens with PG 64-22 and PG 52-34 are binders for which there is a risk of irreversible deformation above 64° C. and 52° C. respectively, and a risk of thermal cracking under −22° C. and −34° C. respectively. In North America, bitumens with PG 64-22 and PG 52-34 may respectively be selected for the Midwest and part of the Canada. The approach of the Superpave specifications is opposed to that of the traditional specifications described previously, the latter being based on properties which were determined at a given temperature and for which the mechanical performance criterion should be adapted to the climatic area.

Whatever the specifications used (either the traditional or the superpave), the choice of the bitumen grade for making an asphalt mix to be used in order to construct a pavement in a given geographical area as a rule is made by taking various parameters into account, and in particular depending on the climatic conditions of said geographical area, on the level of traffic stress onto said pavement, and on the final structural function of the asphalt mix (binder course, wearing course, sub-grade course . . . ). Thus, for given climatic conditions, for a given level of traffic stress, and a given structural function, there is one bitumen which grade enables to ensure optimum mechanical performances for the asphalt mix and therefore for the pavement; such bitumen is called "base bitumen", or more generally speaking, "base binder".

In practice, the parameter kept for selecting the grade of the binder used for making asphalt mixes is in particular the climatic conditions under which the asphalt mixes will be used. That is the reason why, in the road construction field, it is a common practice to make a base binder correspond to a given geographical area. In the American Southwest (for example, Los Angeles), the base binder usually has the PG 64-10. In the North-eastern quarter of the United States, the base binder usually has the PG 64-22. In Alaska, the base binder usually has the PG 52-34. In the South of France, the base binder is usually a binder with grade 30/50. In the East of France or in mountainous regions, the base binder usually has the grade 50/70.

As previously explained, hydrocarbon-based pavements do undergo an ageing phenomenon due to the climatic conditions and to traffic-induced stresses, such ageing expressing through the formation of ruts and/or fatigue cracks and/or thermal cracks. A rehabilitation of the pavement may then become necessary in order to preserve the road safety and to prevent any further degradation of the pavement body which would require a global reconstruction, and therefore would result in much more substantial rehabilitation expenses.

To rehabilitate a pavement, the first step usually consists in recovering recycled bituminous materials.

It is a common practice to use recycled bituminous materials originating from the recycling of damaged bituminous courses by lifting asphalt plates or by milling the same. The materials for reworking are then crushed/screened so as to have granulometrically homogeneous batches. The thus obtained recycled bituminous materials are called reclaimed asphalt pavements (RAP). Reusing RAP in bituminous asphalt mixes is a common practice in most European countries (EN 13108-8 and CEN 2005a standards) and in the United States where it has been incorporated in the method "standard specification for superpave volumetric mix design" (AASHTO M 323). RAP have indeed a mean composition similar to that of bituminous asphalt mixes classically produced and integrated within pavements, i.e. an average bitumen content by weight ranging from 3% to 6% relative to the RAP total weight, the reminder of the composition being a mineral mixture of chips, sands and fines. However, bitumen present in RAP did undergo an ageing process from the beginning of the production and construction steps, and thereafter gradually in the existing asphalt mix through oxidizing phenomena and chemical transformation. This ageing does express through the loss of volatile components, and therefore through hardening, which can be observed by simply measuring the RAP binder rheological properties, after extraction of the latter from the RAP. Thus, the binder of an RAP originating from a pavement located in a geographical area, for which the base binder is of PG 64-22 may correspond to a harder binder, for example to a binder with PG 82-16 or PG 88-10, or even with harder grades.

More recently, recycled asphalt shingles (RAS) originating either from damaged asphalt shingle batches, rejected as soon as they were made, either from asphalt shingles removed after roof repairs have also been employed as recycled bituminous materials. Once they have been cleared from any possible residues (wood, nails . . . ), recovered shingles are finely chipped and screened so as to facilitate their incorporation into asphalt mixes. The thus obtained recycled asphalt shingles generally comprise from 15 to 35% by weight of bitumen, from 50 to 60% of a fine mineral filler and from 1 to 12% of glass or cellulose fibers. The bitumen from RAS did undergo a stronger ageing phenomenon than reclaimed asphalt pavements; it is therefore typically harder than those used in road applications.

The second step of the pavement rehabilitation process consists in mixing and hot coating a given amount of RAP and/or RAS and of new aggregates with new bitumen (called "added binder"), and if necessary with other additives such as fibers and/or polymers. The amount of recycled bituminous materials (RAP and/or RAS) may vary from a few percents to almost 100% by weight relative to the final mixture total weight.

During this second step, the one or more binder(s) of RAP and/or RAS, called "aged binder(s)", is or are activated upon contacting new overheated aggregates, under the hot air flow of the dryer, and is or are being mixed more or less completely to the new added bitumen ("added binder"). Rheological properties of the resulting binder (mixture of the one or more aged binder(s) given to the added binder), will depend on both the characteristics of the added binder, on those of the one or more aged binder(s), and on the proportion according which this or these aged binder(s) are comprised in the mixture formed with new bitumen; such proportion depending on both the RAP/RAS content in the asphalt, on their composition and on the activation rate of their binder. When the RAP/RAS content is low relative to the granular mixture total weight (new aggregates and recycled bituminous materials), incorporating the one or more aged binder(s) into the added binder will have a negligible effect on the grade of the added binder. On the contrary, when the RAP/RAS content is high, such as of from 30 to 65% and above, the effect of the one or more aged binder(s) on the rheological properties of the added binder is substantial.

The asphalt mixes obtained at the end of this second step will be used for constructing new pavements. Their mechanical properties will therefore have to ensure their workability and their compaction in a workmanlike manner, as well as the pavement performances in service. Now the hardening of the added binder through the one or more aged binder(s) of recycled bituminous materials may lead to workability problems for the asphalt mix and to higher risks of cracking in the pavement.

It is therefore necessary to adapt the grade of the added binder so as to compensate the stiffening of said binder, as a result of the combination thereof with the one or more aged binder(s) of the recycled bituminous materials. The SHRP program plans 3 cases:

Case n° 1) For making an asphalt mix comprising a low content of recycled bituminous materials, for example lower than 15% by weight relative to the granular mixture total weight (new aggregates and recycled bituminous materials), that is to say of from 0 to 17% by weight of the aged binder(s) relative to the total weight of the mixture of added binder and aged binder(s), adding the one or more aged binder(s) to the added binder will have a negligible effect on the grade of the added binder. As a consequence, no adaptation of the added binder is required; the added binder usually has the same grade as the base binder of the pavement for which the asphalt mix is intended to be used.

Case n° 2) For making an asphalt mix comprising an intermediate content of recycled bituminous materials, for example of from 15% to 30% relative to the granular mixture total weight (new aggregates and recycled bituminous materials), that is to say of from 18% to 27% by weight of the aged binder(s) relative to the total weight of the mixture of added binder and aged binder(s), the added binder is selected with a softer grade than the base binder of the pavement for which the asphalt mix is intended to be used. Thus, if the base binder is of PG 64-22, the added binder is for examples selected from the PG 58-28 and PG 52-28 grades.

Case n° 3) For making an asphalt mix comprising a high content of recycled bituminous materials, for example of more than 30% by weight relative to the granular mixture total weight (new aggregates and recycled bituminous materials), that is to say of more than 28% by weight of the aged binder(s) relative to the total weight of the mixture of added binder and aged binder(s), the grade of the added binder will be determined in such a way that the binder resulting from the mixture of aged binder and added binder meets the performance criteria of the SHRP characterization of the geographical area. The added binder is therefore necessarily chosen with a softer grade than the base binder of the pavement for which the asphalt mix is intended to be used.

Using an added binder with a softer grade than that of the base binder has many drawbacks: (i) binders with soft grades are commonly more expensive than those with harder grades; (ii) multiplying binders in the coating plant is problematic and results in additional costs for logistics (deliveries, storage . . . ) because a tank must be necessarily provided for each binder grade.

SUMMARY OF THE INVENTION

It is therefore an object of the present invention to develop alternatives to the use of added binders with a softer grade than the base binder for making asphalt mixes comprising a high content of recycled bituminous materials (that is to say those having an intermediate content and/or a high content of recycled bituminous materials, Case n° 2 and n° 3 previously described). The alternatives should allow to preserve or even to improve the workability, the compactability and the performances of said asphalt mixes, while simplifying their production method and reducing the costs for their implementation.

To be able to solve this technical problem, the applicant discovered that incorporating glycerol in an added binder with a given grade makes it possible to obtain asphalt mixes with a high content of recycled bituminous materials, easier to handle and more compactible, but also efficient or even more efficient than asphalt mixes comprising the same content and the same mixture of recycled bituminous materials, but having been made from an added binder with a softer grade, especially a grade softer than the base binder of the pavement for which the asphalt mixes are intended to be used.

More precisely, the applicant discovered that the use of glycerol as an additive for an added binder with a given grade enables to produce asphalt mixes with a high content of recycled bituminous materials having a better rutting resistance, and/or a workability and/or a cracking resistance that is or are similar to or higher than those of asphalt mixes comprising the same content and the same mixture of recycled bituminous materials, but which were made from an added binder with a softer grade, according to the applicable specifications.

The patent FR0858128 describes the use of glycerol to lower the production temperature of asphalt mixes which do not comprise any recycled bituminous material.

It is an object of the present invention to provide an asphalt mix with a high content of recycled bituminous material, to be used for making a course for a pavement to be applied in a geographical area, said mix comprising a granular mixture and an added binder, characterized in that the granular mixture comprises at least 15% by weight of recycled bituminous materials relative to the granular mixture total weight, and in that said asphalt mix comprises glycerol.

The present invention also relates to an asphalt mix with a high content of recycled bituminous materials to be used for making a course for a pavement to be applied in a geographical area, said mix comprising (i) a granular mixture comprising recycled bituminous materials consisting of aggregates and aged binder(s), and (ii) an added binder, characterized in that said aged binder(s) represent(s) at least 18% by weight of the total weight of the mixture of added binder and aged binder(s), and in that said asphalt mix comprises glycerol.

In some embodiments, the asphalt mix according to the invention has the following characteristics considered either alone or in combination:

- glycerol preferably represents from 1 to 4% by weight of the added binder weight;
- the added binder of the asphalt mix according to the invention has the same grade as the base binder of a pavement course in said geographical area;
- the added binder is preferably selected from the PG 76-22, PG 70-28, PG 70-22, PG 67-22, PG 64-22, PG 64-10, PG 58-28 and PG 52-34 grades;
- the added binder represents from 2 to 7%, preferably from 3 to 5% by weight of the total weight of the asphalt mix with a high content of recycled bituminous materials;
- the granular mixture comprises at least 15%, especially more than 30% by weight of recycled bituminous materials relative to the granular mixture total weight;
- the recycled bituminous materials are preferably selected from reclaimed asphalt pavements and recycled asphalt shingles;

the granular mixture comprises from 15 to 65%, especially from 15 to 30%, or from 30% to 65% by weight of recycled bituminous materials relative to the total weight thereof;

the granular mixture comprises from 10 to 35% by weight of chips relative to the total weight thereof;

the granular mixture comprises from 20 to 45% by weight of sand relative to the total weight thereof;

the granular mixture comprises from 0 to 5% by weight of fines relative to the total weight thereof;

the one or more aged binder(s) originating from the recycled bituminous materials represent(s) at least 18%, in particular from 18% to 27%, and even more preferably more than 28% by weight relative to the mixture total weight of aged binder(s) and added binder.

It is still another object of the present invention to provide a manufacturing method of an asphalt mix comprising a mixture of recycled bituminous materials and at least one added binder such as previously described, to be applied in a geographical area, said method comprising the following steps:

a) determining the grade of the base binder for making a pavement course in said geographical area;

b) selecting an added binder having the same grade as the one of the base binder determined in step a);

c) preparing a granular mixture comprising recycled bituminous materials consisting of aggregates and aged binder(s), said aged binder(s) representing at least 18% by weight of the total weight of the mixture of added binder and aged binder(s) added in step d);

d) bringing the granular mixture prepared in step c) in contact with the added binder chosen in step b) enriched with glycerol in order to obtain said mix, said glycerol representing from 1 to 4% by weight of the added binder weight.

According to an alternative of the invention, in step c, the granular mixture comprises at least 15% by weight, especially at least 30%, of recycled bituminous materials relative to the granular mixture total weight, where such condition may be cumulated or not with a content of aged binder higher than or equal to 18% by weight of the total weight of the mixture of added binder and aged binder(s).

It is still another object of the present invention to provide the use of the asphalt mix according to the invention for making a pavement course in a geographical area. Advantageously, the added binder of the asphalt mix according to the invention has the same grade as the base binder of a pavement course in said geographical area.

It is still a further object of the present invention to provide the use of glycerol for improving the workability and/or the thermal cracking resistance and/or the rutting resistance of an asphalt mix with a high content of recycled bituminous materials, such as the one of the invention, that is to say of an asphalt mix comprising (i) a granular mixture comprising recycled bituminous materials consisting of aggregates and aged binder(s), and (ii) an added binder, said aged binder(s) representing at least 18% by weight of the total weight of the mixture of added binder and aged binder(s).

BRIEF DESCRIPTION OF THE DRAWINGS

FIG. 1 illustrates the various binder grades according to the Superpave specifications of the AASHTO M320-10 American standard.

DETAILED DESCRIPTION OF THE INVENTION

Figure 2:
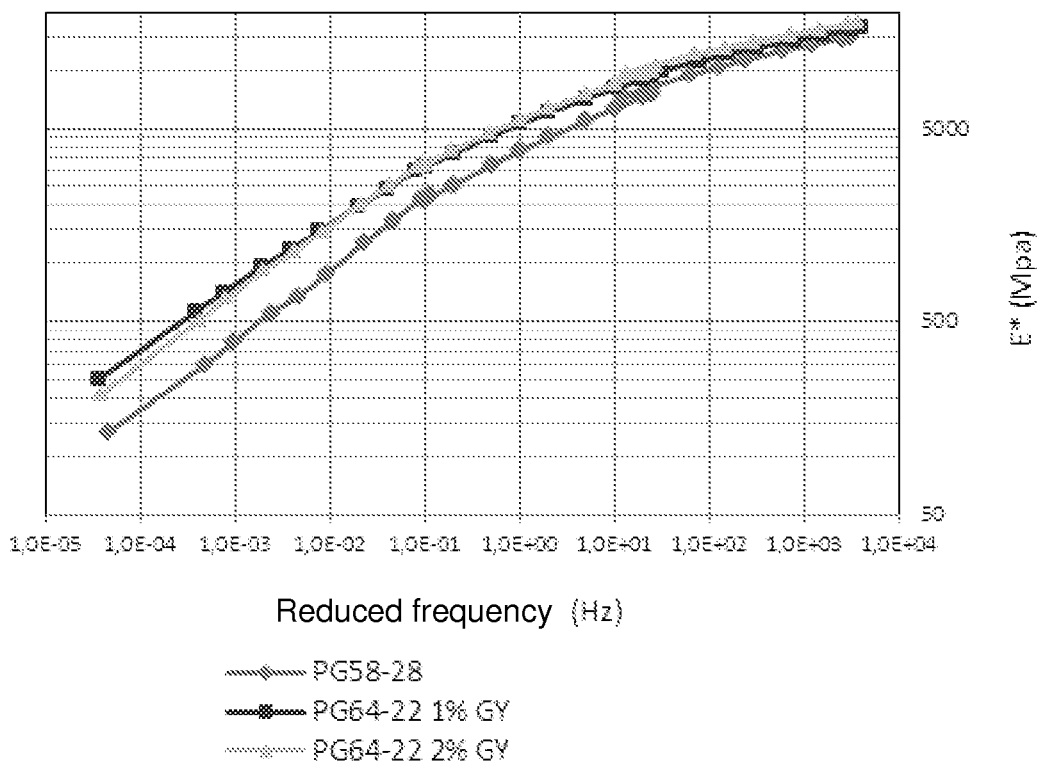
FIG. 2 illustrates dynamic complex modulus E* values of the asphalt mixes of the invention and of control asphalt mixes having undergone the AMPT test according to the AASHTO TP79 American standard.
Figure 2:
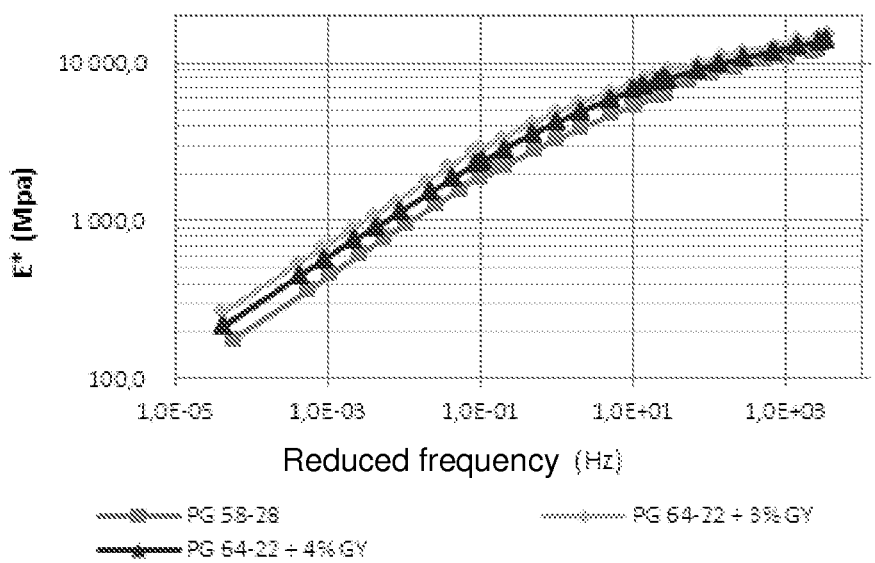

According to the invention, the asphalt mix with a high content of recycled bituminous materials comprises a granular mixture comprising at least 15%, especially from 15 to 65%, in particular more than 30% by weight of recycled bituminous materials relative to the granular mixture total weight. In particular embodiments, the asphalt mix with a high content of recycled bituminous materials comprises a granular mixture comprising from 15 to 30% or from 30% to 65% by weight of recycled bituminous materials relative to the granular mixture total weight.

As used herein, a granular mixture is intended to mean in particular a mixture of recycled bituminous materials and non bituminous aggregates.

The recycled bituminous materials according to the invention are preferably selected from reclaimed asphalt pavements (RAP) and recycled asphalt shingles (RAS).

Suitable reclaimed asphalt pavements (RAP) for use in the present invention do preferably meet the specifications of at least one of the following standards: EN 13108-8, CEN 2005a, and AASHTO M 323. Reclaimed Asphalt pavements do especially result from the crushing/sieving of mills or asphalt mix plates originating from pavement demolitions, or asphalt mixes wastes or asphalt mixes produced in excess. Suitable reclaimed asphalt pavements for use in the present invention comprise by weight relative to their total weight, from 3% to 6% of a bituminous binder (called "aged binder" as a result of the ageing and thus hardening thereof), and from 94% to 97% by weight of a mineral granular mixture consisting of chips, sands and fines, and optionally small gravels. Suitable aged binders of the reclaimed asphalt pavements for use in the present invention have a grade according to the Superpave specifications, selected from the PG 76-10, PG 76-16, PG 76-22, PG 76-28, PG 76-34, PG 82-10, PG 82-16, PG 82-22, PG 82-28, and PG 82-34 grades.

Suitable recycled asphalt shingles (RAS) for use in the present invention originate from the recycling of asphalt shingles used for roofing, and/or of those originating from batches determined as having fabrication defects. The materials for reworking obtained, particularly those originating from roof repairs, are cleared from any possible residues (nails, wood for examples), then they are chipped and screened to the expected size so as to facilitate their incorporation in the asphalt mixes. The thus obtained recycled asphalt shingles comprise from 15% to 35% of bituminous binder (called "aged binder" as a result of the ageing and thus hardening thereof), from 50 to 60% of a fines mineral filler, and from 1 to 12% of glass or cellulose fibers. The recycled asphalt shingles originating from defective batches for use in the present invention comprise an aged binder with a ball-ring softening temperature measured according to the ASTM D 36 standard of from 88 to 113° C. The recycled asphalt shingles originating from roof repair for use in the present invention comprise an aged binder with a ball-ring softening temperature measured according to the standard ASTM D 36 of from 100 to 150° C.

According to the invention, the recycled bituminous materials contained in the asphalt mix are reclaimed asphalt pavements (RAP) or recycled asphalt shingles (RAS) or a combination of both. Suitable mixtures of reclaimed asphalt pavements (RAP) and recycled asphalt shingles (RAS) for use in the present invention are mixtures comprising from 60 to 100% of reclaimed asphalt pavements, and from 0 to 40% of recycled asphalt shingles.

A suitable particular mixture of reclaimed asphalt pavements (RAP) and recycled asphalt shingles (RAS) for use in the present invention comprises from 80 to 100% of reclaimed asphalt pavements and from 0 to 20% of recycled asphalt shingles.

Another suitable particular mixture of reclaimed asphalt pavements (RAP) and recycled asphalt shingles (RAS) for use in the present invention comprises 90% of reclaimed asphalt pavements and 10% of recycled asphalt shingles.

In a particular embodiment, the asphalt mix with a high content of recycled bituminous materials comprises at least 15%, in particular at least 50%, of a mixture of recycled bituminous materials comprising from 80 to 100% of reclaimed asphalt pavements and from 0 to 20% of recycled asphalt shingles.

According to the invention, the asphalt mix with a high content of recycled bituminous materials comprises at least 18%, in particular from 18% to 27%, or more than 28% by weight of the aged binder(s) originating from the recycled bituminous materials relative to the total weight of the mixture of added binder and aged binder(s).

According to the invention, the non bituminous aggregates do preferably meet the specifications of the AASHTO M43 standard or the XP P 18-545 standard. According to the invention, a non bituminous aggregate is a natural or synthetic aggregate, which is new or has been recycled, and does not contain any bitumen. A natural aggregate is an aggregate of mineral origin, which did not undergo any transformation other than a mechanical one. A synthetic aggregate is an aggregate of mineral origin resulting from an industrial process comprising thermal transformations or others. A recycled aggregate is an aggregate which was obtained upon treating an inorganic material previously used in the construction. In a preferred manner, the non bituminous aggregates are selected from chips, coarse gravel, sands, and fines (fillers). Coarse gravel-are aggregates resulting from a mixture of chips and sand. Coarse gravel may be produced by mixing chips and sand or through direct production. According to the invention, fines preferably originate from the dust collector of the coating plant, but may also be non recycled added fillers.

According to the invention, the particle size of recycled bituminous materials and non bituminous aggregates varies preferably from 0 to 20 mm, and even more preferably from 0 to 10 mm. According to national and international specifications, the particle size is expressed in a plurality of different ways. For example, according to the French specifications XP P 18-545, the particle size is expressed as "d/D". Such designation considers that particles may be retained on the higher screen (percent retained on D) and that others may pass through the lower screen (percent passing on d). According to the invention, the particle size of recycled bituminous materials and non bituminous aggregates is preferably selected from the particle sizes 0/2, 2/6, 6/10, 10/14 and 14/20 (according to the French specifications), or from the particle sizes N° 10, N° 9, N° 8, N° 78, N° 67, and N° 57 (according to the American specifications and to the AASHTO M43 standard). As specified in the XP P 18-545 standard, fines (fillers) have particle sizes lower than 0.063 mm, sands have a particle size of 0/2, chips are aggregates for which 2<D<45 mm and d>2 mm, and coarse gravel are aggregates for which d=0 and 2<D<45 mm.

In a preferred embodiment, the asphalt mix with a high content of recycled bituminous materials containing a granular mixture comprises, relative to the granular mixture total weight:
- at least 15%, in particular from 15 to 65%, by weight of recycled bituminous materials, the particle size of said recycled bituminous materials ranging preferably from 0 to 19 mm, in particular from 0 to 12.5 mm, even more particularly from 0 to 9.5 mm,
- from 10 to 35% by weight of chips, preferably with a particle size ranging from 2 to 6 mm, especially with a particle size selected from the particle sizes N° 9, N° 8, N° 78, N° 67, and N° 57 according to the AAHTO M-43 standard,
- from 20 to 45% by weight of sands, preferably with a particle size ranging from 0 to 2 mm, especially with a particle size N° 10 according to the AAHTO M-43 standard, and
- from 0 to 5% by weight of fines, preferably with a particle size lower than 0.063 mm.

According to the invention, the asphalt mix with a high content of recycled bituminous materials comprises (i) a granular mixture composed of non bituminous aggregates and aggregates originating from recycled bituminous materials, such as previously described, and (ii) a binder comprising an added binder, aged binder(s) originating from said recycled bituminous materials, and glycerol.

According to the invention, the binder comprising an added binder, aged binder(s) originating from said recycled bituminous materials and glycerol is the binder which is used for coating the non bituminous aggregates and the aggregates originating from the recycled bituminous materials, such as previously described; this binder does correspond to the final binder, also called regenerated binder.

According to the invention, the aged binder is the bituminous binder originating from recycled bituminous materials previously described, that is to say from reclaimed asphalt pavements and/or asphalt shingles.

According to the invention, the added binder is the binder which is added to the granular mixture during the mixing step in the method for making asphalt mixes according to the invention. During this mixing step which is carried out under the traditional preparation conditions applicable to hot mixes, the added binder is brought to such a temperature that it becomes liquid. At this temperature, the one or more aged binder(s) of the recycled bituminous materials partially or totally liquefy and so combine together with the added binder. In an embodiment, the added binder which is added to the granular mixture during the mixing step in the method for making the asphalt mixes of the invention comprises glycerol. In an embodiment, the added binder represents from 2 to 7%, and preferably from 3 to 5% by weight of the total weight of the asphalt mix with a high content of recycled bituminous materials.

The aged binder and the added binder according to the invention are preferably hydrocarbon binders, substantially based on bitumen, or synthetic binders produced from raw materials based on petroleum or biomass, and traditionally used pour making courses and/or surfacing for road construction and/or civil engineering. Bitumen is a mixture of hydrocarbon substances of natural origin extracted from the heavy fraction obtained upon distilling crude oil, or originating from the natural oil reservoirs and coming as a solid (asphalt) or a liquid, with a density ranging from 0.8 to 1.2. The bitumens of the invention may be prepared by any conventional method. Also included as bitumens according to the present invention are the binders of plant origin such as the Vegecol® binders, marketed by the Colas company and described in the patent application FR 2 853 647, petroleum-based synthetic binders, semi-plant binders, or bitumens which were modified through the incorporation of additives of multiple natures such as additives intended to improve the adhesion characteristics, to artificially provide the properties required for forming a cationic emulsion, through the incorporation of elastomers, in the form of reground rubber or equivalent, or also bitumens that were improved through the addition of polymers of various types, such as ethylene and vinyl acetate copolymers, or random copolymers or styrene conjugated diene and styrene block copolymers, for example SBS block copolymers. Mixtures of bitumens of different types may also be used.

In a preferred embodiment, the added binder and/or the one or more aged binder(s) originating from recycled bituminous materials are bitumens derived from crude oil, and more preferably, bitumens having a behaviour classified according to the Superpave specifications of the AASHTO M320-10 American standard.

Figure 1:
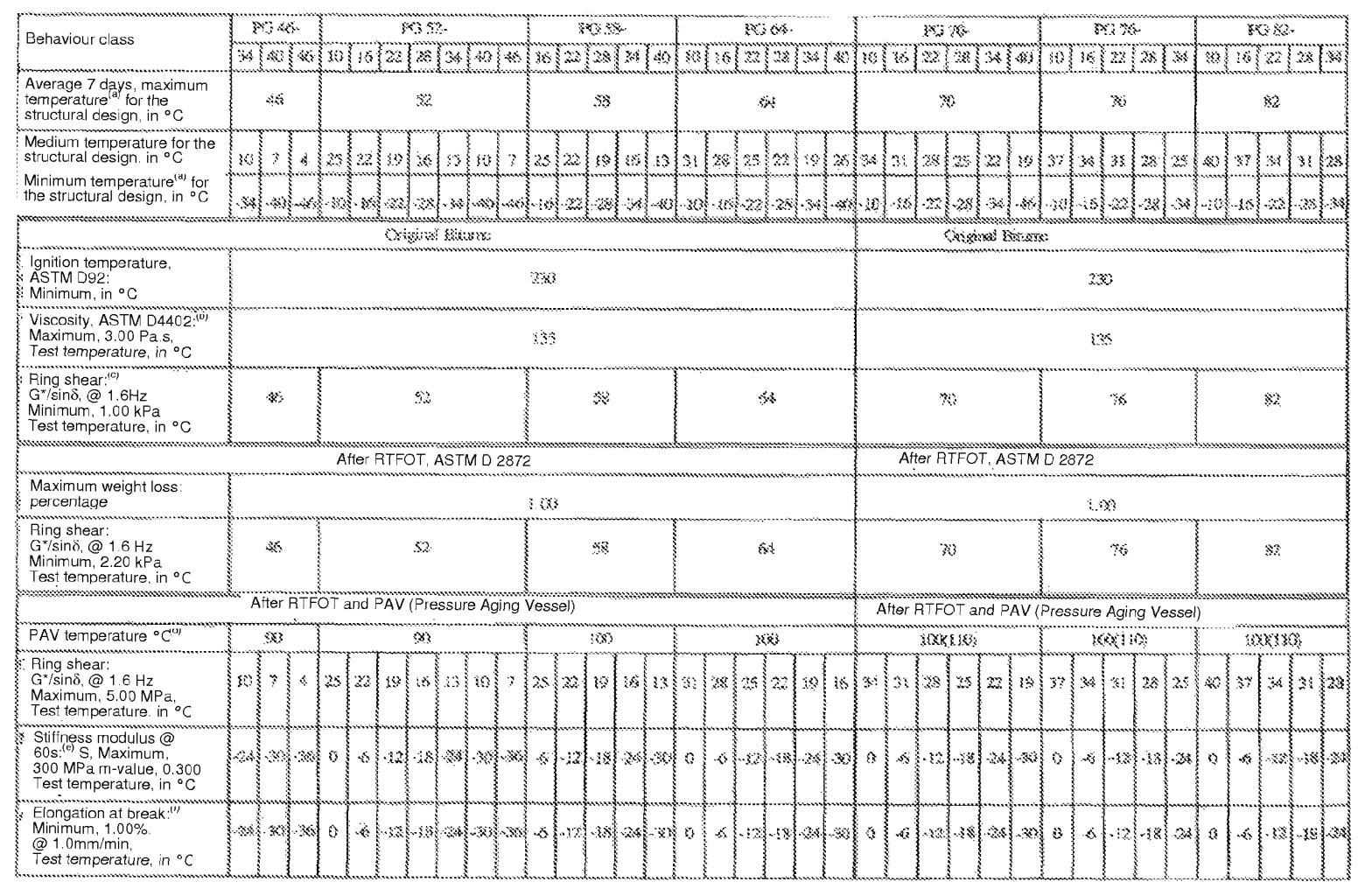

The Superpave specifications which are listed in the table of FIG. 1 were determined based on the mechanical performances of the binders, the characteristics of which correspond to those of a binder, aged or not, under climatic specific conditions, and especially under pavement specific temperature conditions. The Superpave specifications comprise all the PG mentioned in the table of FIG. 1, these being called "behaviour class".

The Superpave specifications are established from mechanical tests effected on an unaged binder (FIG. 1, "original bitumen"), on a short run aged binder (FIG. 1, "after RTFOT") and a long run aged binder (FIG. 1, "after RTFOT and PAV"). The Superpave specifications are especially intended to ensure that a binder having a PG X–Y has the required physicochemical properties in the [X; –Y] temperature range to provide the asphalt mix and/or the pavement course prepared with said binder with mechanical performances, especially good properties of workability, rutting resistance, fatigue strength and thermal cracking resistance.

The RTFOT (Rolling Thin Film Oven Test) and PAV (Pressure Aging Vessel) tests are methods for simulating the ageing of a binder, which are well known to the person skilled in the art.

The RTFOT is specified in the ASTM D2872, EN 12607-1. JIS K2207, and AASHTO T240 standards. This test aims at measuring the effect of heat and air on the physicochemical properties of the binder at a temperature of 163° C., such a temperature corresponding to the usual service temperature for a binder used for making hot mixes during the construction of pavements. This test therefore simulates the ageing undergone by the binder when implemented, said binder being at this stage particularly prone to irreversible deformations.

The PAV test is specified in the AASHTO R28 standard. It consists in measuring the effect of heat under high pressure, the binder being submitted to a pressure of 21 bar for 20 hours at a temperature ranging from 90° C. to 110° C., especially at 90° C., 100° C., 110° C. (FIG. 1, "PAV temperature"). This test aims at simulating the ageing of the binder in the long run, especially its oxidative state after a five- to ten-year retention time within an asphalt mix once having reached its maximum stiffness.

The three main mechanical tests used to determine the grade of binders according to the Superpave specifications are: (i) the 3 point bending beam rheometer (BBR), to evaluate the thermal cracking resistance at low temperature, (ii) the dynamic shear rheometer (DSR), to evaluate the rutting resistance at maximum temperature, and the fatigue strength at intermediate temperature, (iii) the direct tension test (DTT), to evaluate the thermal cracking resistance.

The bending beam rheometer test provides a measure of the stiffness and relaxation characteristics of the binder at low temperature. These parameters provide an indication on the ability of the binder to resist to thermal cracking at low temperatures. The implementation of this test is well known to the person skilled in the art; and is described for example in the AASHTO T313-10 standard. The principle of the BBR test relies on placing a binder beam on load supports and dipping this beam into a cold ethanol bath. A load is applied onto the center of the beam, and the bending of the beam is measured over the time. The stiffness of the binder is then calculated from bending and relaxation measurements of the binder. This test corresponds to the stiffness modulus in the table of FIG. 1.

The dynamic shear rheometer (DSR) test aims at evaluating the resistance of the binder to rutting at maximum temperature and the fatigue strength at intermediate temperature. This test consists in measuring the shear modulus and phase angle at high and medium temperatures. The implementation of this test is well known to the person skilled in the art; and is described for example in the AASHTO T315 standard. This test is carried out on a dynamic shear rheometer. The binder is sandwiched between a plate which is fixed and a plaque which oscillates back and forth. A shear stress at a given frequency is applied on the binder through the oscillating plate. The shear stress applied through the oscillating plate and the shear strain of the binder as a reaction to this stress are measured over the time. The resulting measurements come in the form of sinusoidal curves, the one corresponding to the stress and the other to the strain. From these measures, the phase difference $\delta$ between the two curves and the shear complex modulus $G^*$ (stress/strain) is first calculated. The stiffness of the binder is thereafter calculated, which is defined as $G^*/\sin \delta$. This test corresponds to the ring shear in the table of FIG. 1.

The direct tension test (DTT) provides a measure of the characteristics of stress and strain at failure of the binder at low temperature. This test supplements the BBR test, and may therefore be optimal. The implementation of this test is well known to the person skilled in the art; and is for example described in the ASTM D6723-AASHTO T314 standard. The principle of the test relies on submitting a binder specimen to elongation until the specimen fails. The stress and strain energy at failure are thus measured. This test corresponds to the elongation at break in the table of FIG. 1.

On the one hand, on an unaged binder (FIG. 1, original bitumen) the flash point, for example according to the ASTM D92 or NF EN 2592 standard ("Cleveland open cup flash point test") is also measured for security reasons, as well as the viscosity, for example according to the ASTM D4402 or NF EN 1302 standard ("measurement of asphalt viscosity using a rotational viscometer") for pump ability reasons. For all the PG grades, the Superpave specifications state that the ignition temperature of an unaged binder should not exceed 230° C. and the viscosity of an unaged binder should not exceed 3 Pa·s at a temperature of 135° C. On the other hand, the DSR test also provides a measurement of the stiffness value ($G^*/\sin \delta$) of an unaged binder. A minimum stiffness is specified for an unaged binder to prevent the mixture instability, if the ageing does not occur during the pavement construction. The DSR test enables especially to evaluate the rutting resistance at maximum temperature. The Superpave specification states that the stiffness value ($G^*/\sin \delta$) of an unaged binder should be higher than 1.0 k Pa at 10 rad/s and at the pavement highest temperature for the 7 hottest consecutive days. The pavement highest temperature for the 7 hottest consecutive days corresponds therefore to the temperature at which the stiffness value (G*/sin δ) of an unaged binder exceeds 1.0 kPa at 10 rad/s.

The short run ageing corresponds to the ageing occurring during the pavement construction. It is simulated according to the RTFOT method. On a short run aged binder is measured the weight variation of the binder before and after the RTFOT test, which enables to evaluate the volatility level of the binder. The weight loss of the binder after RTFOT should not exceed 1.0% for all the binder grades defined in the Superpave specifications. Also measured according to the DSR test is the stiffness value (G*/sin δ) of the short run aged binder. A minimum stiffness is specified for a short run aged binder to ensure a sufficient resistance to irreversible deformation immediately after the pavement construction. The DSR test especially enables to evaluate the rutting resistance at maximum temperature. The Superpave states that the stiffness value (G*/sin δ) of the binder after the RTFOT test should be higher than 2.2 kPa at 10 rad/s and at the pavement highest temperature for the 7 hottest consecutive days. The pavement highest temperature for the 7 hottest consecutive days corresponds therefore to the temperature at which the stiffness value (G*/sin δ) of the binder after the RTFOT test exceeds 2.2 kPa at 10 rad/s.

The long run ageing process corresponds to the ageing during the first years of the pavement lifetime (the 5 to 10 first years for example). This ageing is simulated by the RTFOT test, then thereafter by the PAV test.

On a long run aged binder is measured the stiffness according to the DSR test. The maximum stiffness at intermediate temperature is specified for a long run aged binder to prevent the risk of fatigue cracking resulting from an excessively rigid binder. The DSR test especially enables to evaluate the fatigue strength at intermediate temperature. The Superpave specification states that the stiffness G*/sin δ factor value of the binder after RTFOT and PAV should not exceed 5.0 MPa at 10 rad/s and at a temperature said to be intermediate. The intermediate temperature is therefore the temperature at which the stiffness value of the binder after RTFOT and PAV is lower than or equal to 5.0 MPA at 10 rad/s. The intermediate temperature does range between the pavement highest temperature for the 7 hottest consecutive days, and the pavement lowest temperature for the coldest day.

On a long run aged binder is also measured the stiffness modulus according to the BBR test. The BBR test especially enables to evaluate the thermal cracking resistance at low temperature. The Superpave state that the stiffness value S of a binder after RTFOT and PAV should not exceed 300 MPA after 60 s under load and at the lowest temperature (the temperature of the pavement for the coldest day) increased by 10° C. The Superpave specifications also state that the slope value "m" of the logarithmic relationship of the binder loading time after RTFOT and PAV should be higher than 0.300 at the lowest temperature increased by 10° C. after a 60 s-long loading. The lowest temperature (the temperature of the pavement for the coldest day) increased by 10° C. corresponds therefore to the temperature at which the stiffness value S of a binder after RTFOT and PAV is lower than or equal to 300 MPA after having been placed under a 60 s load, and at which the slope value "m" of the logarithmic relationship of the binder loading time after RTFOT and PAV exceeds 0.300. A higher stiffness S (300 MPa<S<600 MPa and m<0.300) is allowed according to the Superpave specification provided that a minimum elongation at break be satisfying, this elongation at break being as described hereafter.

On a long run aged binder is measured the elongation at break of the binder at low temperature according to the DTT test. The DTT test especially enables to evaluate the thermal cracking resistance at low temperature. The Superpave specification states that the elongation at break value of a binder after RTFOT and PAV should be higher than 1.0% at the lowest temperature increased by 10° C. and at 1.0 mm/min. The lowest temperature increased by 10° C. therefore corresponds to the temperature at which the elongation at break value of the binder after RTFOT and PAV exceeds 1.0% at 1.0 mm/min.

In a particular embodiment, the added binder is selected from the grades mentioned in the Superpave specifications of the table of FIG. 1, that is to say PG 46-34, PG 46-40, PG 46-46, PG 52-10, PG 52-16, PG 52-22, PG 52-28, PG 52-34, PG 52-40, PG 52-46, PG 58-16, PG 58-22, PG 58-28, PG 58-34, PG 58-40, PG 64-10, PG 64-16, PG 64-22, PG 64-28, PG 64-34, PG 64-40, PG 67-22, PG 70-10, PG 70-16, PG 70-22, PG 70-28, PG 70-34, PG 70-40, PG 76-10, PG 76-16, PG 76-22, PG 76-28, PG 76-34, PG 82-10, PG 82-16, PG 82-22, PG 82-28, PG 82-34. The added binder is especially selected from the PG 52-40, PG 52-46, PG 58-16, PG 58-22, PG 58-28, PG 58-34, PG 58-40, PG 64-10, PG 64-16, PG 64-22, PG 64-28, PG 64-34, PG 64-40, PG 70-10, PG 70-16, PG 70-22, PG 70-28, PG 70-34, PG 70-40, PG 76-10, PG 76-16, PG 76-22, PG 76-28, PG 76-34, PG 82-10. In particular, the added binder has a grade selected from the PG 76-22, PG 70-28, PG 70-22, PG 64-22, PG 67-22, PG 64-10, PG 58-28 and PG 52-34.

In a particular embodiment, the added binder is a pure bitumen selected from the PG 52-16, PG 52-22, PG 52-28, PG 58-16, PG 58-22, PG 64-16, PG 64-22, PG 70-16.

In another particular embodiment, the added binder is a very pure bitumen selected from the PG 52-34, PG 58-28, PG 58-34, PG 64-28, PG 70-22 and PG 76-16.

In another particular embodiment, the added binder is a modified bitumen selected from the PG 52-40, PG 58-40, PG 64-34, PG 64-40, PG 70-28, PG 70-34, PG 70-40, PG 76-22, PG 76-28, PG 76-34, PG 76-40.

In still another particular embodiment, the added binder is a pure bitumen according to the NF EN 12591 standard; it is selected from the grades 20-30, 30-45, 35-50, 40-60, 50-70, 70-100, 100-150, 160-220, 250-330, especially from the grades 35-50 and 50-70. The numbers of each of these grades do correspond to the penetrability range measured according to the NF EN 1426 standard. The penetrability test consists in measuring the penetration of a needle, into a bitumen specimen within 5 seconds, the weight of which together with its support and an additional load is 100 g.

In still another particular embodiment, the added binder is a bitumen that was modified through polymers, according to the NF EN 14023 standard; it is preferably selected from the grades 10-40, 25-55, 45-80, 40-100, 65-105, 75-130, 90-150, 120-200, 200-300.

In a particular embodiment, the added binder is a hard bitumen according to the NF EN 13924 standard; it is selected from the grades 10-20 and 15-25. In still another particular embodiment, the added binder is a fluidified bitumen (through a petroleum-derived extender) according to the XP T65-002 standard; it is selected from the grades 0/1, 10/15, 150/250, 400/600, 800/1400. In still another particular embodiment, the added binder is a fluxed bitumen according to the XP T65-003 standard; it is selected from the grades 0-1, 10-15, 150-250, 400-800, 800-1600, 1600-6200.

Thanks to the physicochemical values specified in each of the standards, it is possible to know which defined grade according to the NF EN 12591 standard corresponds the best possible to a given defined grade according to the Superpave specifications. Such correspondence does especially reflect the rheological properties of the binders at medium temperatures. For example, a binder with a PG 64-22 has physicochemical properties close to those of a binder having a grade 50-70, and a binder with PG 70-22 has physicochemical properties close to those of a binder having a grade 35-50. To be able to make this correspondence between the superpave specifications and the NF EN 12591 standard, a test may be employed, in addition to a penetrability test according to the NF EN 1426 or ASTM D5 standard which evaluates the stiffness of the binder, such as the brittle point FRAASS according to the NFT 66026 standard which enables to characterize the brittleness of the binder at low temperature. This test consists in casting a binder as a 1 mm-thick film onto a steel blade. The temperature is decreased of 1° C. per mm while applying successive bending movements to the blade under standard conditions. The brittle point is the temperature at which the binder film cracks. The ring and ball softening point test according to the NF EN 1427 or ASTM D36 standard may also be used. This test consists in placing a steel ball on a copper ring, which had been filled beforehand with binder, and in dipping the whole into a bath, the temperature of which is increased at the rate of 5° C. each minute; the softening temperature being that at which the ball, drawing the binder membrane with it, reaches a predefined scale mark.

In an advantageous embodiment, the added binder of the asphalt mix according to the invention has the same grade as the base binder of the pavement course for which said asphalt mix will be used. The base binder, as defined previously is the binder which enables to ensure good mechanical performances under given climatic conditions (climatic requirements), a given level of traffic stress and a given structural function (pavement course type).

As used herein, "climatic conditions or requirements" is intended to mean especially the highest temperature of the pavement course for the 7 hottest consecutive days, and the lowest temperature of the pavement course for the coldest day, and the intermediate temperature such as defined previously in the Superpave specifications. Other climatic criteria like the moisture content, the rainfall rate, the sunshine rate, and gel may also be taken into account.

As used herein, "mechanical performances" is intended to mean essentially the resistance of the pavement course to thermal cracking at the highest and the lowest possible temperatures, the resistance of the pavement course to rutting at maximum temperature, and the resistance of the pavement course to fatigue at intermediate temperature. The cracking resistance is the ability of a pavement course to withstand the formation of cracks, a crack being defined as a breaking line of a pavement course (generally superficial). The failure may have various origins; it may result for example from the temperature (thermal cracking). The rutting resistance is the ability of a pavement course to withstand a longitudinal irreversible deformation caused by the repeated passage of wheels at the same place. The fatigue strength is the ability of a pavement course to withstand the traffic-induced repeated stress. The resistance of the pavement course to thermal cracking at the highest and the lowest possible temperatures, the resistance of the pavement course to rutting at maximum temperature, and the resistance of the pavement course to fatigue at intermediate temperature are traditionally evaluated through standard tests known in the road field. Amongst these tests are especially (i) the tests carried out directly on the asphalt mixes, such as the APA, AMPT, Flow number, DC(T) tests described in the examples of the present application, or the rutting test according to the NF P 98-253-1 French standard. The fatigue behaviour test according to the NF P98-261-1 French standard and (ii) the tests carried out directly on the binder of the pavement course, such as the BBR, DTT, DSR tests previously described. As used herein, the "mechanical performances" are intended to further mean:
the compactibility of the asphalt which can be measured according to the NF P98-252 standard and/or to the AASHTO T312 American standard (Superpave gyratory compactor) and which corresponds to the ability of the asphalt to be implemented with a specified compactness;
the mechanical resistance and the water resistance of the asphalt which can be measured according to the NF P98-251-1 standard and/or to the AASHTO T283-ASTM D4867 American standard (Resistance of compacted Hot Mix asphalt to Moisture-induced damage), and which corresponds to the durability of the asphalt mixes towards the actions of road traffic and to the stripping risk;
the asphalt mix complex modulus, which can be measured according to the NF P98-260-2 standard and which corresponds to the ability of the asphalt mix to withstand the stresses.

As used herein, the "level of traffic stress" is intended to mean a physical measure which reflects both:
the number of vehicle passages in a given place on the pavement course within a given period of time (which corresponds to the road traffic volume), especially the percentage of heavy trucks;
the load per axle, and
the speed of vehicle passages.

As used herein, the "structural function" is intended to mean both the course function (adhesion, permeability, noise, rutting resistance, etc.) and the location of the pavement course which is formed from asphalt mixes according to the invention. The location of the pavement course typically corresponds to the various types of pavement courses such as the wearing course, the binder course, and the sub-grade course (road base foundation and sub-grade course), where each of these courses must have particular mechanical properties. For example, a wearing course must ensure a good adhesion, a great riding comfort by providing a flat surface which does not get deformed under the influence of heavy truck traffic (creep-induced rutting), should limit the rolling noise, limit water projections, prevent glare phenomena, limit dynamic overloads, limit consumption and vehicle wear, protect the pavement subbase materials from water, withstand to climatic damages, facilitate road readability. A binder course should provide a flat surface for implementing the wearing course, protect the pavement subbase from the water infiltrations, not promote creep-induced rutting under the influence of heavy truck traffic. The sub-grade course should provide a flat surface for implementing the binder course or the wearing course, protect from the water infiltrations the sensitive road bed supporting materials, optionally not become deformed under the influence of heavy truck traffic (creep-induced rutting), and essentially distribute the traffic stress on the supporting soil so that the latter does not become deformed under the action of road traffic.

As used herein, a "geographical area" is intended to mean a region over which the climate is preferably entirely of the same type, for example of the continental, oceanic or Mediterranean type.

In the American Southwest (for example, Los Angeles) the base binder having usually a PG 64-10 grade, the added binder according to the invention has preferably a PG 64-10 grade so as to make asphalt mixes that are adapted to this geographical area. In the same way, in the North-eastern quarter of the United States, the base binder having usually a PG 64-22 grade, the added binder according to the invention preferably has a PG 64-22 grade to make asphalt mixes that are adapted to this geographical area, and not a PG 58-28 or 52-28 grade as is classically the case when said asphalt mixes comprise a medium or a high content of recycled bituminous materials (cases 2 and 3 previously described). In Alaska, the base binder having usually a PG 52-34 grade, the added binder according to the invention preferably has a PG 52-34 grade to make asphalt mixes that are adapted to this geographical area. In the South of France, the base binder having usually a 30/50 grade, the added binder according to the invention preferably has a 30/50 grade to make asphalt mixes that are adapted to this geographical area. In the East of France or in mountainous regions, the base binder may be a binder with a 50/70 grade and the added binder according to the invention in this case preferably has a 50/70 grade to make asphalt mixes that are adapted to this geographical area.

The fact that the added binder of the asphalt mix according to the invention has the same grade as the base binder of the pavement course for which said asphalt mix will be used advantageously uses only one tank on the coating site, and thus enables an on line modification of the base binder by adding the desired amounts of glycerol.

According to the invention, an asphalt mix with a high content of recycled bituminous materials comprises glycerol.

According to the invention, glycerol comes in a free form, that is to say glycerol does not form the "alcohol part" of fatty acid esters such as glycerides for example. However, to be mentioned as an example of a method for producing glycerol are hydrolysis and/or transesterification of fatty acid esters originating from renewable natural resources.

In an embodiment, glycerol represents from 1 to 4% by weight of the added binder weight. In another embodiment, glycerol represents from 1 to 4% by weight of the added binder weight, and the added binder represents from 2 to 7%, preferably from 3 to 5% by weight of the total weight of the asphalt mix with a high content of recycled bituminous materials.

The present invention further relates to the use of glycerol for making an asphalt mix with a high content of recycled bituminous materials such as previously defined.

In an embodiment, the present invention relates to the use of glycerol for making an asphalt mix with a high content of recycled bituminous materials to be used for making a course for a pavement to be applied in a geographical area, said mix comprising an added binder and a granular mixture comprising at least 15%, especially more than 30% by weight of recycled bituminous materials relative to the granular mixture total weight.

In another embodiment, the present invention relates to the use of glycerol for making an asphalt mix with a high content of recycled bituminous materials to be used for making a course for a pavement to be applied in a geographical area, said mix comprising (i) a granular mixture comprising recycled bituminous materials consisting of aggregates and aged binder(s), and (ii) an added binder, said aged binder(s) representing at least 18% by weight of the aged binder(s) and added binder mixture total weight.

The present invention further relates to the use of glycerol as a correcting agent for the workability of an asphalt mix with a high content of recycled bituminous materials, preferably of an asphalt mix such as the one previously described. Indeed, according to the invention, glycerol has the effect of modifying the workability, advantageously to improve the workability, of an asphalt mix with a high content of recycled bituminous materials such as the one previously described. As used herein, a "correcting agent" is thus intended to mean a compound which is able to change a physicochemical property, such as workability, thermal cracking resistance (for example at low temperature) or rutting resistance, by increasing or reducing it depending on the expected final result. As used herein, the "workability" is intended to mean the ease of manually or mechanically implementing asphalt mixes, especially their ability to be applied by means of a shovel or a rake and/or to be compacted for example by means of a compactor. The workability criterion illustrates the flexibility of the asphalt mixes. In the road field, a workable asphalt mix is an asphalt mix that is sufficiently stable to withstand the compactor weights, but sufficiently malleable for the compactors to effect an efficient work; a compactor being a public works vehicle used for compacting the soil or a material.

The present invention further relates to the use of glycerol as a correcting agent towards the thermal cracking resistance, especially the cracking resistance at low temperature, of an asphalt mix with a high content of recycled bituminous materials, preferably of an asphalt mix such as the one previously described. Indeed, according to the invention, glycerol has the effect of modifying the thermal cracking resistance, especially at low temperature, of an asphalt mix with a high content of recycled bituminous materials, such as the one previously described, advantageously by increasing the same. Indeed, according to the invention, adding glycerol to a binder having a defined grade makes it possible to obtain an asphalt mix having a cracking resistance at low temperature as good as, or even better than an asphalt mix formed from the same granular mixture and a binder with a softer grade. The cracking resistance at low temperature is a physicochemical property which may be evaluated by means of standard tests, as for example the one according to the ASTM D7313 American standard described hereafter in Example 5.

The present invention further relates to the use of glycerol as a correcting agent towards the rutting resistance of an asphalt mix with a high content of recycled bituminous materials, preferably of an asphalt mix such as the one previously described. According to the invention, glycerol has the effect of modifying the rutting resistance of an asphalt mix with a high content of recycled bituminous materials, such as the one previously described, preferably by increasing the same. Indeed, according to the invention, adding glycerol to a binder having a defined grade makes it possible to obtain an asphalt mix having a rutting resistance as good as or even better than an asphalt mix formed from the same granular mixture and a binder with a softer grade. The rutting resistance is a physicochemical property which may be evaluated by means of standard tests, as for example the one according to the AASHTO T340-10 American standard described hereafter in Example 2.

According to the invention, glycerol does not decrease the temperature for preparing asphalt mixes with a high content of recycled bituminous materials.

As it is neither soluble in the added binder nor in the mixture of aged binder and added binder, glycerol has not any ability to solve the added binder or the binder formed by mixing the added binder and the aged binder originating from recycled bituminous materials. According to the invention, glycerol does not act as a flux since the flux function traditionally consists in reducing the viscosity of bitumen to facilitate its implementation. Without wishing to be bound by any theory, it seems that when glycerol is contacted with the granular mixture and the added binder so as to form the asphalt mix according to the invention, glycerol does migrate at the interface between the aggregates of the granular mixture and the binder obtained by mixing the added binder and the aged binder originating from recycled bituminous materials of the granular mixture. Glycerol then acts as a lubricant, that is to say glycerol comes between the surface of the aggregates and of the binder obtained by mixing the added binder and the aged binder and drastically reduces the friction between these surfaces, which thus promotes the relative movement of one relative to another, and the flowing thereof. As compared to methods using organic solvents for improving the workability of the binder, since the solvent must evaporate during its implementation, the use of glycerol in accordance with the present invention is very advantageous inasmuch as the latter dos not evaporate and thus does not produce any emission to the atmosphere of volatile organic compounds, which are substantially detrimental to the environment.

The asphalt mixes with a high content of recycled bituminous materials according to the invention are used as materials for making surfacing for road construction and/or civil engineering. Advantageously, the base binder of said surfacing for road construction and/or civil engineering has the same grade as the added binder of asphalt mixes according to the invention. Preferably, the asphalt mixes with a high content of recycled bituminous materials according to the invention are used for making surfacing such as binder courses, wearing courses, and sub-grade courses.

The present invention further relates to a method for preparing an asphalt mix with a high content of recycled bituminous materials such as previously described.

In a particular embodiment, the method for preparing an asphalt mix according to the invention comprises in order the following steps: (i) preparing the granular mixture, (ii) continuously or discontinuously heating and introducing the granular mixture into a mixer, (iii) introducing the added binder into the mixer, said added binder comprising glycerol.

Prior to introducing the added binder to the manufacturing method of an asphalt mix according to the invention, the grade of said added binder has to be selected. To that end, the intended application of said asphalt mix has to be determined first, then the performances of the pavement course which will be built up from said asphalt mix. In particular, the pavement course type (sub-grade course, binder course, wearing course) which will be built up from the asphalt mix according to the invention is to be chosen, then the geographical area (climatic requirements) in which said pavement course will be built up, and finally the level of traffic stress which is expected on said pavement course.

Selecting the geographical area especially leads to determine the highest temperature which can be expected for the pavement course during the 7 hottest consecutive days, the lowest temperature of the pavement course during the coldest day, and optionally the intermediate temperature of the pavement course. Determining said temperatures is especially performed by directly measuring the temperature of an existing pavement course in the selected geographical area, or by measuring the ambient air temperature around said pavement course. If the ambient air temperature is measured, this temperature will have to be converted to a pavement temperature, by using mathematic formulas for example such as those described in the publication "superior performing asphalt pavements (superpave): the product of the SHRP asphalt research program", of the National Research Council Washington, D.C. 1994, pages 16-18. Determining the highest temperature the pavement will be exposed to for the 7 hottest consecutive days, as well as the lowest temperature of the pavement for the coldest day may also be performed starting from the LTPPBIND (Long Term Pavement Performance program) statistical data or from information available from weather plants of the countries which geographical area will receive the pavement course. A free access program on the website of the Federal Highway Administration, FHWA, (LT-PPBIND 3.1 http://ltpp-products.com/OtherProducts.asp) enables to use the local temperature database and to select a binder grade (PG grade).

Determining the level of traffic stress especially consists in determining the equivalent load per axle on the pavement course. This technical characteristic is also called equivalent single axle road (ESAL). Determining ESALs is described in Appendix D of the method AASHTO 93 which is extracted from the "AASHTO Guide for Pavement Structures", a reference guide used in the United States by the departments of transportation of the 50 States the District of Columbia for structurally designing road pavements. This structural design method essentially relies on the "AASHO Road Test" performed between 1958 and 1961, which is based on structural coefficients applicable to the various types of road materials. According to the invention, the MEPDG ("Mechanistic Empirical Pavement Design Guide"), still in the pipeline, may also be used, which uses as input data the actual mechanical performances of the various materials, in particular the dynamic modulus, the resistance to irreversible deformation (rutting), and the thermal cracking resistance.

To more completely define the expected performances of a pavement course according to the invention, the Superpave research program may especially be used, described in the publication, "superior performing asphalt pavements (Superpave): the product of the SHRP asphalt research program", of the National Research Council of Washington, D.C. 1994, to be taken in conjunction with the models described in Lytton and al. 1993, "development and validation of performance", report no. SHRP-A-409, Strategic Highway Research Program, of the National Research Council of Washington, D.C., and also the publication of Cominsky and al. 1994, "The Superpave mix design manual new construction and overlays", report no. SHRP-A-407, Strategic Highway Research Program, of the National Research Council of Washington, D.C. To be used is also the software of the Superpave program (LTPP V3.1).

In the road field, the selection approach for the materials used to obtain asphalt mixes, especially the selection as to the nature and the amount of binder and aggregates, is traditionally purely practical, where the person skilled in the art uses her/his general knowledge about the basic materials (binder, aggregate) and about the performances of existing pavements, in order to preselect the most promising asphalt formulations to reach the performances which are expected for the future pavement course. Usually, asphalt mixes resulting from preselected formulations are mechanically tested, in particular according to the previously described tests, then the formulations for said asphalt mixes are suitably adjusted so as to attain the expected performances.

To simplify for the person skilled in the art the selection approach as regards the materials for making asphalt mixes, the previously described Superpave specifications (AASHTO M320-10 American standard) have been developed. These specifications enable to match the rheological properties of the binders and the mechanical performances of the asphalt which will be formulated from said binder. As already explained, the stiffness (BBR test) and elongation at break (DTT test) of the binder affect the thermal cracking resistance at low temperature of the pavement course formulated from said binder, and the dynamic shear resistance (DSR) of the binder affects the rutting resistance at maximum temperature, as well as the fatigue strength at intermediate temperature of the pavement course formulated from said binder.

In principle, the Superpave specifications should therefore ensure that a binder having a defined grade for a temperature pair X-Y will make it possible to obtain, in this temperature range, an asphalt mix or a pavement course having a good thermal cracking resistance at low temperature, a good rutting resistance at maximum temperature, and a good fatigue strength at intermediate temperature, and especially under the most frequent stress conditions of road traffic. Thus, to make an asphalt mix according to the invention, determining the highest temperature the pavement course, which was built up from said asphalt mix, will have for the 7 hottest consecutive days, and determining the lowest temperature the pavement course, which was built up from said asphalt mix, will have for the coldest day is enough to determine both the grade of the base binder for the pavement course built up from said asphalt mix, and the grade of the added binder to make said asphalt mix, the base binder and the added binder having the same grade.

In an embodiment, the method for preparing an asphalt mix according to the invention to be applied in a geographical area comprises the following steps:

a) determining the grade of the base binder for making a pavement course in said geographical area;

b) selecting an added binder having the same grade as the one of the base binder determined in step a);

c) preparing a granular mixture comprising at least 15%, in particular more than 30%, by weight of recycled bituminous materials relative to the granular mixture total weight;

d) bringing the granular mixture prepared in step c) in contact with the added binder chosen in step b) enriched with glycerol in order to obtain said mix.

As used herein, a "pavement course in said geographical area" is intended to mean preferably a pavement course similar to the pavement course which will be built up from of the asphalt mix according to the invention. As used herein, a "similar course" is intended to mean a course having especially the same function (binder course, wearing course, sub-grade course) and a similar road traffic level of stress.

In still another particular embodiment, step a) comprises the following steps:

a1) determining the highest temperature Tmax in Celsius of a pavement course in said geographical area for the 7 hottest consecutive days, and the lowest temperature Tmin in Celsius of a pavement course in said geographical area for the coldest day;

a2) selecting a base binder having a PG X-Y according to the AASHTO M320-10 standard, for which the X value is higher than or equal to the Tmax value determined in step a1), and for which the Y value is lower than or equal to the Tmin value determined in step a1).

In a particular embodiment, step a2) consists in selecting a base binder having a PG X-Y according to the AASHTO M320-10 standard, the X and Y values being such that:

(i) the X value is higher than or equal to the Tmax value determined in step a1) and the deviation between the X value and the Tmax value determined in step a1) is the lowest, and (ii) the Y value is lower than or equal to the Tmin value determined in step a1) and the deviation between the Y value and the Tmin value determined in step a1) is the lowest.

According to the Superpave specifications, according to the AASHTO M320-10 standard, the X values may be for example 46° C., 52° C., 58° C., 64° C., 70° C., 76° C. or 82° C., and the Y values may be for example −10° C., −16° C., −22° C., −28° C., −34° C., −40° C., or −46° C. The X value should be chosen so as to be closest higher or equal to the Tmax value. For example if Tmax is equal to 60° C., a PG will be preferably chosen, for which the X value is 64° C. (PG 64-Y). Or if Tmax is equal to 66° C., a PG will be preferably chosen, for which the X value is 70° C. (PG70-Y). In the same way, the Y value should be chosen so as to be closest lower than or equal to the Tmin value. For example, if Tmin is equal to −11° C., a PG will be preferably chosen, for which the Y value is equal to −16° C. (PG X−16). Or if Tmin is equal to −18° C., a PG will be preferably chosen, for which the Y value is equal to −22° C. (PG X−22). Thus, if the Tmax value is equal to 66° C. and the Tmin value is equal to −11° C., a 70-16 PG will be preferably chosen. Or, if the Tmax value is equal to 66° C. and the Tmin value is equal to −18° C., a 70-22 PG will be preferably chosen.

In a particular embodiment, the method for preparing an asphalt mix according to the invention to be applied in a geographical area comprises the following steps:

a1) collecting a specimen of a new pavement course in said geographical area;

a2) extracting the binder from the specimen of step a1);

a3) measuring at least one technical characteristic of the binder extracted in step a2) selected from penetrability at 25° C. according to the standard NF EN 1426, ring and ball softening point according to the standard NF EN 1427, pseudo viscosity according to the NF EN 12846-2 standard, energy to failure and strain at failure of the binder at low temperature according to the ASTM D2936 standard, dynamic shear resistance according to the AASHTO T315 standard, and stiffness modulus of the binder according to the AASHTO T313-10 standard;

b) selecting an added binder having a grade for which the one or more technical characteristic(s) of step a2) are verified;

c) preparing a granular mixture comprising at least 15%, especially more than 30% by weight of recycled bituminous materials relative to the granular mixture total weight;

d) bringing the granular mixture prepared in step c) in contact with the added binder chosen in step b) enriched with glycerol in order to obtain said mix.

As used herein, a "new pavement course" is intended to mean a pavement course which has not undergone any practice-induced damage, or very few, such as damages resulting from the level of traffic stress and from the weather conditions. It does especially mean a pavement course that should be less than 5 years old.

Collecting a pavement course specimen, and extracting the binder are performed by means of any known method applicable to the road field, especially by coring the pavement, then through extraction of the binder using organic solvents such as trichloroethylene, methylene chloride, n-propyl bromide (nPB), dichloromethane, toluene or xylene, or an ammonium carbonate saturated solution.

The embodiments described previously may have following alternatives.

In a particular embodiment, the granular mixture of step c) comprises at least 50% by weight of recycled bituminous materials relative to the total weight thereof.

In still another particular embodiment, the granular mixture of step c) comprises, by weight relative to the total weight thereof:

from 15 to 65% of recycled bituminous materials,
from 10 to 35% of chips,
from 20 to 45% of sand, and
from 0 to 5% of fines.

In still another particular embodiment, step c) consists in preparing a granular mixture comprising recycled bituminous materials consisting of aggregates and aged binder(s), said aged binder(s) representing at least 18% by weight of the aged binder(s) and added binder mixture total weight added in step d).

In this embodiment, the weight content of aged binder(s) in the recycled bituminous materials is measured beforehand. To that end, the one or more aged binder(s) in the recycled bituminous materials may for example be extracted by means of traditional methods for measuring the weight thereof relative to the total weight of recycled bituminous materials used for the test. The extraction of the one or more aged binder(s) is traditionally performed using organic solvents such as trichloroethylene, methylene chloride, n-propyl bromide (nPB), dichloromethane, toluene, xylene or an ammonium carbonate saturated solution. The extraction is especially performed just on a specimen of recycled bituminous materials, and not on the total amount of bituminous materials which will be used to make the asphalt mix according to the invention. The specimen is preferably a distinct specimen of the recycled bituminous materials which will be used for preparing the granular mixture according to the invention. In order to obtain a sufficiently precise value of the weight content of aged binder(s), the extraction of the aged binder(s) may be performed according to the ASTM D 2172 standard, on a specimen of recycled bituminous materials weighting from 500 grams to 4000 grams depending on the maximum particle size of the recycled bituminous materials, respectively of from 4.75 mm to 37.5 mm.

In a particular embodiment, the method according to the invention comprises, after the previously described steps a) then b, the following steps:

c) preparing a granular mixture comprising, relative to the total weight thereof, at least 15%, especially more than 30% by weight of recycled bituminous materials consisting of aggregates and aged binder(s), d1) measuring the weight content of aged binder(s) in the recycled bituminous materials used in step c), said measurement being performed on a same specimen of recycled bituminous materials as those used in step c).

d2) calculating the amount of added binder for which the total amount of aged binder(s) contained in the recycled bituminous materials used in step c) represents at least 18% by weight of the aged binder(s) and added binder mixture total weight d3) putting the granular mixture prepared in step c) in contact with the amount of added binder calculated in step d2) enriched with glycerol to obtain such asphalt mix.

In the previously described embodiments, glycerol added to the added binder represents from 1 to 4% by weight of the added binder weight.

In a particular embodiment, the added binder represents from 3 to 7% by weight of the asphalt mix total weight and glycerol represents from 1 to 4% by weight of the added binder weight.

The amount of glycerol which is added to the added binder is determined depending on the amount of recycled bituminous materials, more precisely depending on the amount of aged binder(s) contained in said recycled bituminous materials, and depending on the amount of added binder.

For making an asphalt mix with a high content of recycled bituminous materials, it is common to use tables called blending charts, so as to obtain a final binder having the expected viscosity and/or grade. Two situations may apply:

1. For one or more aged binder(s) (recycled binder(s)) and an added binder with given grade and viscosity, the amount of recycled bituminous materials to be used may be determined, that is to say the aged binder(s) proportion to obtain the desired grade and viscosity in the mixture (that is to say in the final binder), or
2. For one or more aged binder(s) (recycled binder(s)) with given grade and viscosity and a proportion of given recycled bituminous material, the grade and/or the viscosity of the added binder may be determined to obtain the desired grade and viscosity in the mixture (that is to say in the final binder).

In the context of the present invention, since one of the objectives is to maximize the proportion of recycled bituminous materials, the second case will be preferably carried out.

According to the invention, it is possible for example to choose the proportion of added binder depending on the proportion and viscosity of the one or more aged binder(s) originating from the recycled bituminous materials so as to obtain a final binder having the desired viscosity. The blending chart typically used to that end is a chart having on the abscissa, the mixture composed of "aged binder(s)+added binder", with variable weight percentages for both of the components (the scale ranging for example from 0% of aged binder(s)/100% of added binder to 100% of aged binder(s)/0% of added binder), and on the ordinates, the viscosity values for each mixture. For establishing this chart type, aged binder(s) are beforehand extracted from the recycled bituminous materials so as to measure the viscosity thereof, for example according to the ASTM D4402 standard. The mixing charts (mixing curves) may be based on the viscosity of the added binders and aged binder(s) (recycled binder(s)), or, according to the Superpave specifications, based on the PG temperatures, i.e. high, low and medium, of those added binders and aged binder(s) (recycled binder(s)).

In the context of the present invention, glycerol neither is soluble in the added binder nor in the mixture of aged binder(s) and added binder. It is therefore not possible to use this blending chart type to evaluate the rheological properties of the final binder (mixture of aged binder, added binder and glycerol) which will be used for coating the non bituminous aggregates and the aggregates originating from the recycled bituminous materials. To best define the amount of glycerol which will be added to the added binder, an empirical research is done, based on asphalt formulation tests and performance measurements of said asphalt mixes. The results thereof are detailed hereafter in the Example section.

For example, asphalt mixes are prepared from of a determined granular mixture comprising non bituminous aggregates and recycled bituminous materials, and from various formulations of added binder and glycerol mixtures. The amount of aged binder(s) is determined by previously defining the composition of the granular mixture, especially based on the amount of recycled bituminous materials used. The amount of added binder is moreover dictated by the amount of aged binder(s) contained in the recycled bituminous materials (the one or more aged binder(s) representing at least 18% by weight of the total weight of the mixture of added binder and aged binder(s), and/or by the asphalt mix total weight (the added binder representing from 2 to 7% by weight of the asphalt mix total weight). The granular mixture and the amount of added binder are fixed; only the amount of glycerol does vary. One of the advantages of the present invention is that the amount of glycerol is directly adjustable and controllable in the production method on line since glycerol can be injected on line directly to the added binder (see hereunder the detailed description of injection). One of the interesting property of glycerol in the present invention is therefore to modify on line the added binder so as to obtain an asphalt mix which properties are similar or better than those of an asphalt mix made from a base binder meeting the local climatic conditions.

Indeed, once the fabrication of asphalt mixes comprising variable contents of glycerol has been achieved, the workability and the performances of said asphalt mixes are evaluated. Especially measured are the rutting resistance and the thermal cracking resistance (in particular at low temperature) thereof, by conducting mechanical tests such as those previously described, and/or such as the APA, AMPT, Flow number, or DC(T) tests described in the examples of the present application.

In parallel, under the same experiment conditions, control asphalt mixes are prepared, which do not comprise glycerol and which added binder has a softer grade than the one used in the invention, that is to say the added binder which would usually be used in the prior art (example 1). The workability and the mechanical performances of said control asphalt mixes are then evaluated.

It should be noted that a softer binder is traditionally a binder that is more malleable at elevated temperatures and less brittle at lower temperatures. As used herein, "more malleable at elevated temperatures" is intended to mean especially a more elevated penetrability value according to the NF EN 1426 or ASTM D5 standard and/or a lower softening point according to the NF EN 1427 or ASTM D36 standard.

Glycerol-containing formulations of asphalt mixes are then selected, for which the workability and the thermal cracking resistance at low temperature are at least equivalent, or even better than those of the control asphalt mixes. This selection enables thus to determine the glycerol optimal amount for use according to the method of the invention.

It should be noted that since the behaviour and the performances of asphalt mixes having the same granular mixture essentially depends on the binder, the comparison of their respective performances enables to directly compare the behaviour and the performances of the final binders of the control asphalt mixes and the asphalt mixes according to the invention, and especially to compare the added binder modified with glycerol as compared to the added binder that has not been modified with glycerol.

In the previous embodiments, putting the granular mixture in contact with the added binder enriched with glycerol may be performed in a mixer at a temperature higher than 130° C., especially at a temperature of 140° C., or 150° C. or 160° C. More precisely, the granular mixture and the added binder are introduced continuously or discontinuously into a mixer that has been beforehand heated to a temperature higher than 130° C., especially to a temperature of 140° C., or 150° C. or 160° C. Glycerol is added directly to the added binder before its introduction into the mixer.

According to the invention, modifying the added binder through glycerol addition occurs advantageously directly on the plant on line, that is to say glycerol is injected on line into the added binder prior to being added to the granular mixture to be coated, which means that the relative contents of glycerol and added binder may be controlled directly on the plant on line. As a specific advantage, this method makes it possible to spare a plurality of tanks for storing the binders (for example, one tank for the binder that has not been modified with glycerol and one tank for each different formulation of added binder and glycerol), and to better control the homogeneity of the dispersion of glycerol within the added binder.

As used herein, the "injection on line" is intended to mean especially an operation consisting in incorporating glycerol into the distribution circuit of the added binder upstream of the mixer, wherein the added binder enriched with glycerol is intended to be incorporated. An example of direct injection may be carried out for example according to the following procedure:

(i) the added binder is stored in a tank equipped with a mechanical pumping system linked to a distribution circuit placed upstream of the mixer, to which the granular mixture will be incorporated;

(ii) glycerol is stored in a tank separate from that of the added binder, said tank being equipped with a mechanical pumping system linked to a distribution circuit connected to the distribution circuit of the added binder, the connection between both systems being effected upstream of the mixer;

(iii) glycerol and the added binder are sucked to the desirable amounts through their respective pumping system. The proportion of glycerol injected into the added binder is controlled by a servo-system working together with the added binder pump and the production of the plant. Thus, whatever the production of the plant, the proportion of glycerol in the added binder is respected.

(iv) glycerol is injected into the distribution circuit of the added binder upstream of the mixer and a homogeneous mixture is obtained by flowing through a static mixer.

(v) the mixture "glycerol/added binder" is introduced into the mixer.

In a particular embodiment, the method according to the invention comprises, after the steps a) then b) and c) previously described, the following step:

d) bringing the granular mixture prepared in step c) in contact with the added binder chosen in step b) enriched with glycerol in order to obtain said mix, said glycerol representing from 1 to 4% by weight of the added binder weight, and being injected on line into the added binder prior to being put in contact with said granular mixture.

In a particular embodiment, the method according to the invention comprises, after the steps a) then b) and c) previously described, the following steps:

d1) injecting glycerol on line to the added binder chosen in step b), said glycerol representing from 1 to 4% by weight of the added binder weight, d2) bringing in contact the granular mixture prepared in step c) with the added binder enriched with glycerol prepared in step d1).

EXAMPLES

These examples are extracted from test series on productions prepared in a coating plant, thus reproducing the best possible actual industrial conditions.

Example 1

Asphalt mixes PG58-28 of series 1 and 2 are control asphalt mixes. Asphalt mixes PG64-22 1%, PG64-22 2%, PG64-22 3%, PG64-22 4% are asphalt mixes according to the invention. The binder with PG 58-28 is softer than the binder with PG 64-22. Series 1 and 2 were prepared from various batches of binders and recycled bituminous materials (reclaimed asphalt pavements and recycled asphalt shingles). The maximum nominal size of the control asphalt mixes and the asphalt mixes of the invention is 9.5 mm.

| | series 1 | | | series 2 | | |
|---|---|---|---|---|---|---|
| Asphalt mix identification | PG58-28 | PG64-22 1% GY | PG64-22 2% GY | PG58-28 | PG64-22 3% GY | PG64-22 4% GY |
| Granular mixture* | 50% of a mixture consisting of 90% by weight of reclaimed asphalt pavements (RAP) and 10% by weight of recycled asphalt shingles (RAS) relative to the mixture weight 17% of natural, crushed, non bituminous aggregates of size 3/10 mm 32% of non crushed, alluvial sand of size 0/6 mm 1% of fines | | | 50% of a mixture consisting of 90% by weight of reclaimed asphalt pavements (RAP) and 10% by weight of recycled asphalt shingles (RAS) relative to the mixture weight 20% of natural, crushed, non bituminous aggregates of maximum nominal size 4.75 mm 29% of non crushed, alluvial sand of size 0/6 mm 1% of fines | | |
| Added binder | Bitumen PG58-28 | Bitumen PG64-22 | Bitumen PG64-22 | Bitumen PG58-28 | Bitumen PG64-22 | Bitumen PG64-22 |
| Total amount** of added binder and aged binder(s) (after extraction) | 5.2% | 5.1% | 4.9% | 5.8% | 5.8% | 5.8% |
| Amount*** of glycerol | 0% | 1% | 2% | 0% | 3% | 4% |
| Production temperature of asphalt mixes | 143° C. | 152° C. | 152° C. | 152° C. | 162° C. | 164° C. |

*weight percentage relative to the granular mixture total weight
**weight percentage relative to the asphalt mix total weight
***weight percentage relative to the added binder weight Control asphalt mixes PG58-28 of the series 1 and 2, and the asphalt mixes of the invention PG64-22 1% GY, PG64-22 2% GY, PG64-22 3% GY, PG64-22 4% GY have the same workability.

Example 2

A rutting resistance test for the asphalt mixes of Example 1 has been carried out according to the AASHTO T340-10 American standard called "Rutting susceptibility of hot mix asphalt using the asphalt pavement analyzer (APA)". This test enables to simulate the rutting resistance of asphalt mixes by measuring the irreversible deformation at unique high temperature and at a unique frequency in the plastic deformation region.

The 6 types of asphalt mixes of Example 1 have been compacted so as to obtain a void fraction of 7±0.5%, they have been preheated at 64° C. and thereafter submitted to 8000 loading cycles. The load applied by three steel wheels was 445N, through hoses inflated with a air pressure of 70307 kg/m².

| | Series 1 | | | Series 2 | | |
|---|---|---|---|---|---|---|
| Asphalt mix identification | Control PG58-28 | PG64-22 1% GY | PG64-22 2% GY | Control PG58-28 | PG64-22 3% GY | PG64-22 4% GY |
| Rut depth (mm) with 95% confidence intervals | 6.40 ± 1.61 | 4.00 ± 0.65 | 5.20 ± 0.23 | 5.50 ± 1.76 | 5.30 ± 1.62 | 5.03 ± 0.98 |
| Rut depth standard deviation | 0.65 | 0.26 | 0.10 | 0.71 | 0.65 | 0..40 |

The results show that the control asphalt mixes of series 2 are stiffer than the control asphalt mixes of series 1 despite of similar formulations. One of possible reasons for this is that the aged recycled binder(s) of the asphalt shingles used in series 2 is or are stiffer than the one of the recycled asphalt shingles used in series 1. The shingles of series 2 came indeed from roof repairs and had suffer from a corresponding binder ageing degree, whereas those of series 1 came from batches with fabrication defects, which did not therefore undergo any ageing process. This underlines the influence of stiffness of aged recycled binder(s) in the bituminous materials on the final properties of the asphalt mixes prepared from these materials.

The results of series 1 show that asphalt mixes comprising 1% or 2% by weight of glycerol relative to the added binder weight better resist to rutting than the control asphalt mixes do, which did not comprise any glycerol. These results also show that the more glycerol in the mix, the less resistant to rutting, which emphasizes that, while no modifying the binder, glycerol has a softening effect on the asphalt mix.

The results of series 2 show that asphalt mixes comprising 3% or 4% by weight of glycerol relative to the added binder weight are as much resistant to rutting as the control asphalt mixes, which did not comprise any glycerol.

As a consequence, the asphalt mixes of the invention are as much resistant to, or even more resistant to, rutting as/than the control asphalt mixes.

Example 3

The dynamic complex modulus E* of asphalt mixes of Example 1 was measured according to the AASHTO TP79 American standard called "Determining the dynamic modulus and flow number for hot mix asphalt using the asphalt mixture performance tester (AMPT)". This test evaluates the dynamic deformation over all the temperature and frequency ranges in the linear viscoelastic region of small deformations. The deformation rate of this test which is ranging from 75 to 125 microdef was therefore lower than that of the rutting resistance APA test of Example 2 which was within the plastic region. The microdeformation (or microdef) corresponds to the ratio between deformation and initial size of the specimen expressed in ppm ($10^{-6}$).

The AMPT principle consists in submitting 150 mm high × 100 mm diameter cylinder-shaped specimens of asphalt mixes, also compacted to 7±0.5%, to a cyclic dynamic load in the linear viscoelastic region of small deformations so as to simulate the action of road traffic on pavement. This enables to measure the dynamic modulus E* which corresponds to the stiffness of asphalt mixes having low to high service temperatures and low to high loading frequencies simulating for example the road traffic speed. The dynamic modulus E* thus characterises the asphalt structural contribution to the structure of pavement. E* measurements (in MPa) are typically carried out at 5° C., 20° C. and 50° C. and at frequencies ranging from 0.01 Hz to 25 Hz. The results are generally illustrated in the form of index contours, made according to a time-temperature equivalence concept, at a reference temperature of 20° C.

FIG. 2 illustrates the dynamic complex modulus E* values for the asphalt mixes of Example 1 having undergone the AMPT test such as previously described.

Both measurement series illustrated on FIG. 2 clearly show that the more glycerol in the asphalt mix, the more the latter behaves like the asphalt mix control. In other words, the more glycerol in binder PG 64-22, the more it behaves like binder PG 58-28. Adding glycerol tends therefore to make these properties of a binder with a harder grade converge towards a binder with a softer grade.

Example 4

After the non-destructive measurement of the dynamic complex modulus E* of Example 3, a creep test was carried out on the asphalt mix specimens on the same AMPT equipment. The creep test was intended to measure the same properties as the rutting resistance APA test of Example 2, that is to say the irreversible deformation at a unique high temperature and at a unique frequency in the plastic deformation region.

Asphalt mixes having undergone the AMPT test of Example 3 were submitted to a series of cycles alternating 0.1 second under load and 0.9 second relaxation in the region of large plastic deformations at elevated temperatures (58° C.). This enabled to measure the number of cycles ("flow number", Fn) which corresponds to the number of loading cycles, wherein the asphalt mixes go from secondary deformation region, where the deformation is proportional to the load, to a non linear tertiary deformation mode. The "flow number, Fn" therefore corresponds to the turning point of the specimens deformation curve, or to the minimum of the derivative of the function f (deformation, cycle), which also corresponds to the deformation acceleration of the material and to the begin of its failure.

| Asphalt mix identification | Series 1 | | | Series 2 | | |
|---|---|---|---|---|---|---|
| | Control PG58-28 | PG64-22 1% GY | PG64-22 2% GY | Control PG58-28 | PG64-22 3% GY | PG64-22 4% GY |
| Number of cycles, Fn, with 95% confidence intervals | 55 ± 10 | 129 ± 48 | 95 ± 9 | 63 ± 6 | 86 ± 14 | 49 ± 14.5 |
| Standard deviation of the number of cycles, Fn | 11 | 52 | 10 | 7 | 16 | 16 |

As explained in Example 2, the asphalt mixes of series 1 and 2 cannot be compared directly because the aged recycled binder(s) of the bituminous materials is or are stiffener in series 2 as compared to series 1.

However, for both series, it can be clearly observed that the asphalt mixes of the invention are as much resistant to, or even more resistant to, rutting as/than the control asphalt mixes, the results of the PG58-28 and PG64-22 4% GY specimens of series 2 being not significantly different. These results therefore confirm the tests performed in Example 2.

Example 5

A cracking test at low temperature has been carried out according to the ASTM D7313 American standard called "Low temperature cracking susceptibility measures through fracture energy of asphalt-aggregate mixtures using the disk-shaped compact tension (DC(T))"

The disk-shaped specimens (150 mm diameter×50 mm high) were cut in compacted asphalt mix specimens under the same conditions as for the previous tests. A notch was made in these disks onto which a voltage was applied with a constant strain rate (0.017 mm/s "crack mouth opening displacement", CMOD) and the crack mouth opening resistance of the material was measured. The notch was made to simulate a failure, the whole function f (force, displacement) reflected the energy to failure and the strain at failure. The measurements were carried out at a temperature by 10° C. higher than that of the grade low temperature of the added binder. In this example, the added binder is PG 64-22, that is to say the low temperature is −22° C. and the test is performed at −12° C.

|  | Series 1 | | | Series 2 | | |
| --- | --- | --- | --- | --- | --- | --- |
| Asphalt mix identification | Control PG58-28 | PG64-22 1% GY | PG64-22 2% GY | Control PG58-28 | PG64-22 3% GY | PG64-22 4% GY |
| Energy to failure (J/m$^2$) with intervals 2 × σ | 318.5 ± 39 | 325 ± 78 | 373.3 ± 48 | 339.7 ± 125 | 306.3 ± 73.9 | 298.7 ± 118.5 |

The standard deviations for the energy to failure and strain at failure values observed for each type of asphalt mix are too high to enable to make a significant difference between the various asphalt mixes. It then appears that asphalt mixes of series 1 and 2 according to the invention have the same cracking resistance at low temperature than the control asphalt mixes of series 1 and 2.

| | Series 3 - 40% of RAP vs. 50% of a mixture consisting of 90% RAP and 10% RAS as in series 1 and 2 | |
| --- | --- | --- |
| Asphalt mix identification | Control PG58-28 | PG64-22 0% GY |
| Energy to failure (J/m$^2$) | 381.8 ± 68.4 | 297.5 ± 58.2 |

In series 3, as expected, asphalt mix PG 64-22 0% GY is more brittle at low temperature than asphalt control PG 58-28. As expected, with no addition of glycerol, binder PG 64-22, which is harder than binder PG 58-28, provides the asphalt mix with a lower thermal cracking resistance.

Asphalt mix PG 64-22 3% GY or asphalt mix PG 64-22 4% GY (series 2) is not more brittle at low temperature than asphalt mix PG 64-22 0% GY of series 3, whereas asphalt mix PG 64-22 3% GY or asphalt mix PG 64-22 4% GY comprises a granular mixture containing only 10% of RAS; which emphasizes the positive effect of glycerol on the low temperature cracking resistance.

To conclude, the whole mechanical tests show on the one hand that the asphalt mixes of the invention are as much resistant to, or even more resistant to, rutting as/than the control asphalt mixes, and that they are as much resistant to low temperature cracking as the control asphalt mixes. Thus, the asphalt mixes of the invention offer similar performances, or even better performances than the asphalt mixes of the prior art classically used for a given road surfacing. All the mechanical tests show on the other hand that a binder having a defined grade and having been modified with glycerol has similar or even better performances as compared to a binder with a softer grade.

The invention claimed is:

1. An asphalt mix with a high content of recycled bituminous materials to be used for making a course for a pavement to be applied in a geographical area, said mix comprising (i) a granular mixture comprising recycled bituminous materials consisting of aggregates and aged binder(s), and (ii) an added binder characterized in that said aged binder(s) represent(s) at least 18% by weight of the total weight of the mixture of aged binder(s) and added binder, and in that said asphalt mix comprises glycerol.

2. An asphalt mix according to claim 1, characterized in that the added binder has the same grade as the base binder of a pavement course in said geographical area.

3. An asphalt mix according to claim 2, characterized in that glycerol represents from 1 to 4% by weight of the added binder weight.

4. An asphalt mix according to claim 1, characterized in that glycerol represents from 1 to 4% by weight of the added binder weight.

5. A method for preparing an asphalt mix according to claim 4 to be applied in a geographical area, said method comprising the following steps:
   a) determining the grade of the base binder for making a pavement course in said geographical area;
   b) selecting an added binder having the same grade as the one of the base binder determined in step a);
   c) preparing a granular mixture comprising recycled bituminous materials consisting of aggregates and aged binder(s),
   d) bringing the granular mixture prepared in step c) in contact with the added binder chosen in step b) enriched with glycerol in order to obtain said mix, glycerol representing from 1 to 4% by weight of the added binder weight and said aged binder(s) representing at least 18% by weight of the total weight of the mixture of aged binder(s) and added binder.

6. A method according to claim 5, characterized in that the added binder of step b) represents from 2 to 7% by weight of the asphalt mix total weight.

7. A method according to claim 6, characterized in that glycerol is injected on line into the added binder before step d).

8. A method according to claim 6, characterized in that step a) comprises the following steps:
   a1) determining the highest temperature Tmax in Celsius of a pavement course in said geographical area for the 7 hottest consecutive days, and the lowest temperature Tmin in Celsius of a pavement course in said geographical area for the coldest day;
   a2) selecting a base binder having un PG X-Y according to the AASHTO M320-10 standard, the X and Y values being such as:
   (i) the X value is higher than or equal to the Tmax value determined in step a1) and the deviation between the X value and the Tmax value determined in step a1) is the lowest, and
   (ii) the Y value is lower than or equal to the Tmin value determined in step a1) and the deviation between the Y value and the Tmin value determined in step a1) is the lowest.

9. A method according to claim 5, characterized in that glycerol is injected on line into the added binder before step d).

10. A method according to claim 9, characterized in that step a) comprises the following steps:
   a1) determining the highest temperature Tmax in Celsius of a pavement course in said geographical area for the 7 hottest consecutive days, and the lowest temperature Tmin in Celsius of a pavement course in said geographical area for the coldest day;

a2) selecting a base binder having un PG X-Y according to the AASHTO M320-10 standard, the X and Y values being such as:

(i) the X value is higher than or equal to the Tmax value determined in step a1) and the deviation between the X value and the Tmax value determined in step a1) is the lowest, and (ii) the Y value is lower than or equal to the Tmin value determined in step a1) and the deviation between the Y value and the Tmin value determined in step a1) is the lowest.

11. A method according to claim 5, characterized in that step a) comprises the following steps:

a1) determining the highest temperature Tmax in Celsius of a pavement course in said geographical area for the 7 hottest consecutive days, and the lowest temperature Tmin in Celsius of a pavement course in said geographical area for the coldest day;

a2) selecting a base binder having un PG X-Y according to the AASHTO M320-10 standard, the X and Y values being such as:

(i) the X value is higher than or equal to the Tmax value determined in step a1) and the deviation between the X value and the Tmax value determined in step a1) is the lowest, and (ii) the Y value is lower than or equal to the Tmin value determined in step a1) and the deviation between the Y value and the Tmin value determined in step a1) is the lowest.

12. An asphalt mix according to claim 1, characterized in that the added binder represents from 2 to 7% by weight of the total weight of the asphalt mix with a high content of recycled bituminous materials.

13. An asphalt mix according to claim 1, characterized in that the added binder is selected from the PG PG 76-22, PG 70-28, PG 70-22, PG 64-22, PG 67-22, PG 64-10, PG 58-28 and PG 52-34.

14. An asphalt mix according to claim 1, characterized in that the granular mixture comprises at least 15% by weight of recycled bituminous materials relative to the granular mixture total weight.

15. An asphalt mix according to claim 1, characterized in that the recycled bituminous materials are selected from reclaimed asphalt pavements and recycled asphalt shingles.

16. An asphalt mix according to claim 1, characterized in that the granular mixture comprises relative to the total weight thereof:

from 15 to 65% by weight of recycled bituminous materials, from 10 to 35% by weight of chips, from 20 to 45% by weight of sand, and from 0 to 5% by weight of fines.

17. Method for making a pavement course, which comprises providing an effective amount of the asphalt mix of claim 1, and using the asphalt mix to make the pavement course.

18. Method for improving the workability and/or the thermal cracking resistance and/or the rutting resistance of an asphalt mix comprising (i) a granular mixture comprising recycled bituminous materials consisting of aggregates and aged binder(s), and (ii) an added binder, said aged binder(s) representing at least 18% by weight of the total weight of the mixture of aged binder(s) and added binder, which comprises adding an effective amount of glycerol to said asphalt mix.

\* \* \* \* \*